Patented June 21, 1927.

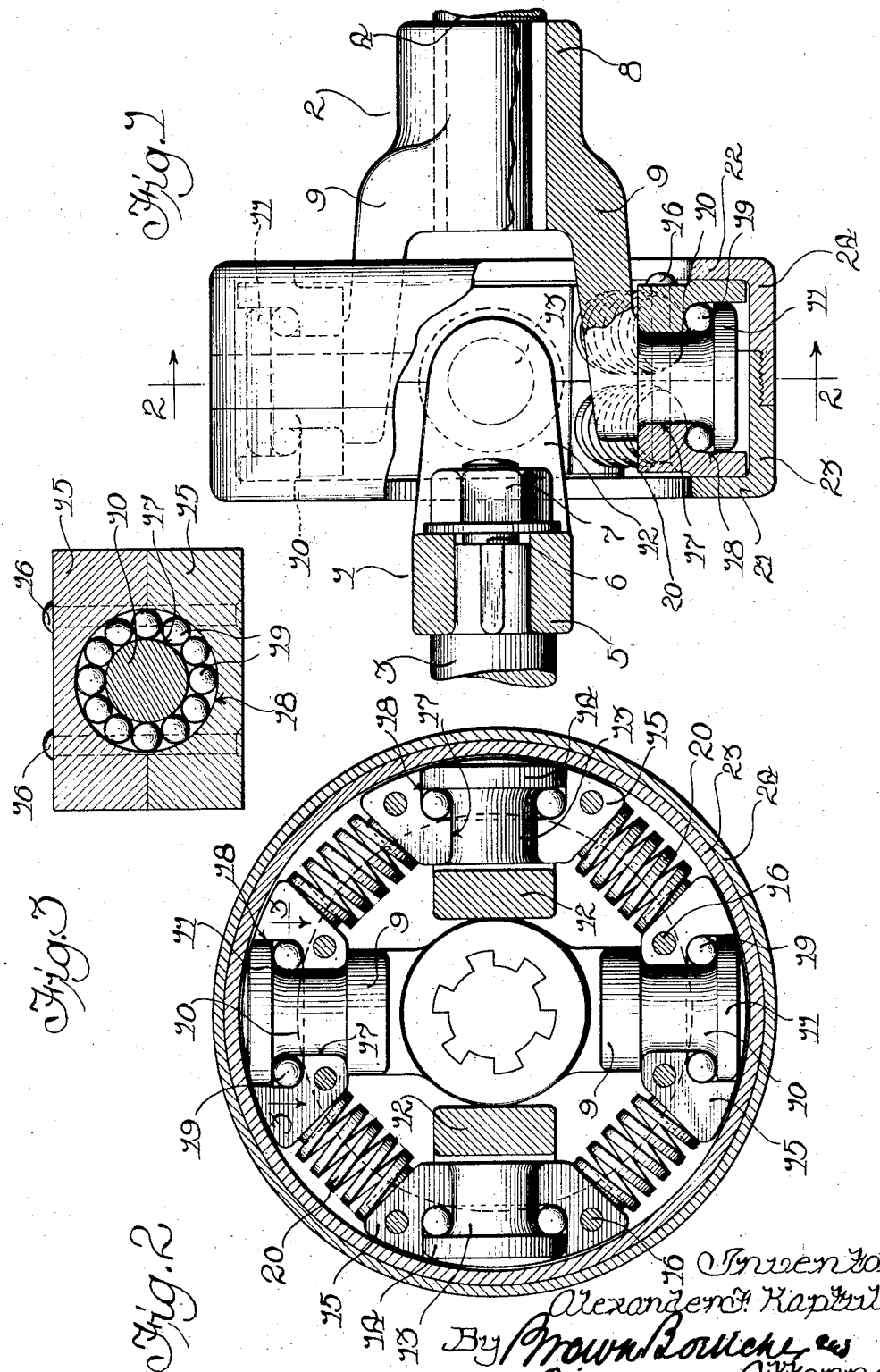

1,633,333

UNITED STATES PATENT OFFICE.

ALEXANDER F. KAPTULLER, OF CHICAGO, ILLINOIS.

UNIVERSAL JOINT.

Application filed October 11, 1920. Serial No. 416,283.

My invention relates to universal joints and more particularly to universal joints of the type by means of which two rotatable shafts may be coupled together in such manner that power will be properly transmitted between the shafts when the axes of the shafts are disaligned or non-coincident as well as when such axes are in alignment or substantially coincident.

While the joint of my invention is particularly adapted for use in connection with the power transmission mechanism of automobiles, motor trucks and analogous apparatus, I do not intend to limit the invention to such uses or purposes only.

Joints of this general description consist of a pair of yoke or joint members secured to the driving and driven shafts respectively. Pivotal movement of these yoke or joint members about pivots associated with each, permits disalignment of the axes of the shafts without interfering with the proper transmission of power therebetween. In joints of this type as usually constructed heretofore, the drive has been directly from one yoke or joint member to the other through the pivots associated with these members. The pivots and consequently the joint members themselves have been fixed relative to one another in the direction of rotation of the shafts. This rigidity of the driving connection has placed the entire stress, occasioned by the driving force upon the pivot pins or shafts about which the yoke or joint members are adapted to pivot. The suddenly acting forces caused by the frequent stopping and starting and change speed operations to which motor vehicles, for example, are subjected aggravate these stresses to which the joint is subjected frequently to such extent as to shear off the pivot pins or otherwise injure the joint.

In my improved joint the drive is through a yieldable driving connection of improved construction between the driving and driven shafts. The pivot pins about which the yoke or joint members are adapted to pivot are relieved of the great stresses to which they have heretofore been subjected. By thus relieving those parts which have heretofore been the weakest points of a joint of this character, of the stresses to which they have heretofore been subjected, I have increased the durability of the joint by decreasing its liability to damage or injury. Furthermore, having relieved the pivots of the joint of the stresses to which they have been heretofore subjected, I am enabled to decrease the dimensions of such pivots and thereby produce a more compact device than heretofore. The yieldable driving connection between the driving and driven shafts effectively cushions and evens out the suddenly acting driving forces transmitted through the joint.

Certain details of construction which are novel and important and are made the subject matter of some of the appended claims together with other features of the invention including an improved assembly, will appear from the following detailed description and the claims taken with an inspection of the accompanying drawings in which:

Figure 1 is a side elevational view partly in longitudinal section of a joint embodying my invention;

Figure 2 is a transverse vertical sectional view taken substantially on the line 2—2 of Figure 1; and Figure 3 is a horizontal sectional view taken substantially on the line 3—3 of Figure 2.

Referring to the drawings the joint of my invention comprises a pair of forks or yoke members 1 and 2 mounted at their hubs upon the driving and driven shafts to be connected. It is between these shafts that the present invention provides for transmitting the drive when the axes of the shafts are out of alignment or not coincident as well as when they are in proper alignment. While of course, it is immaterial which particular shaft the respective yoke members are mounted upon, that is, it does not matter which is the driving and which is the driven member, assume in order to facilitate this description that the shaft 3 is the driving shaft, such as for example, the engine shaft of a motor vehicle, while the shaft 4 is the propeller or jack shaft through which the drive is transmitted to the driving wheels of the vehicle.

The hub or head 5 of the yoke member or fork 1 is provided with a tapered bore for the reception of the correspondingly tapered end of the shaft 3. The end of the shaft 3, the tapered portion of which shaft is splined against relative rotation in the hub 5, is reduced and threaded as shown at 6 for the reception of a suitable nut 7 by means of which nut relative longitudinal movement between the shaft and the hub 5 is effectively prevented. The bore provided through the hub or head portion 8 of the yoke member 2 is splined or feathered for the reception of the correspondingly splined or feathered end of the shaft 4. While relative rotation between the shaft 4 and hub 8 is thereby effectively prevented, a sliding engagement is had for allowing a certain amount of relative longitudinal movement between the shaft 4 and the hub 8.

The yoke arms 9—9 projecting beyond the hub portion 8 of the yoke member 2 are provided with laterally projecting bearing or pivot pins 10—10 adjacent their outer ends. The free ends of these laterally projecting bearing or pivot pins 10—10 terminate in annular flanges or shoulders 11—11. In substantially the same manner, the yoke arms 12—12 projecting beyond the hub portion 5 of the yoke member 1 are provided with laterally projecting bearing or pivot pins 13—13 adjacent their outer ends, the axis of which projecting pins 13—13 normally intersects the axis of the bearing pins 10—10 at substantially right angles, with the axes of the shafts 3 and 4 preferably coincident with each other, and with the axes of said pins in radial position with respect to the axis of said shafts. The free or outer ends of the laterally projecting bearing pins 13—13 terminate in annular flanges or shoulders 14—14 similar to the flanges or shoulders 11—11 of the pins 10—10.

Mounted upon each of the laterally projecting bearing pins 10—10 and 13—13 of the yoke members 1 and 2, respectively, are a pair of cooperating bearing blocks 15—15, the opposing flat surfaces of which are provided with supplemental semi-circular depressions. The cooperating bearing blocks 15—15 are securely clamped together with their opposing flat faces in engagement, by means of suitable bolts or rivets 16, the supplemental semi-circular depressions thereby effecting substantially continuous bores 17 through which the radially projecting pins 10—10 and 13—13 extend. The outer ends of the substantially continuous bores 17 thereby provided are counterbored as shown at 18 for receiving the annular flanges or shoulders at the ends of the bearing or pivot pins of the joint. Suitable anti-friction balls 19 arranged about the pins 10—10 and 13—13 between the flanges 11—11 and 14—14 and the shoulders provided at the junctures of the bores 17 and counterbores 18 provided in the cooperating bearing blocks 15—15, provide for the free turning of the yoke members 1 and 2 about the axes of their respective pivots.

As hereinbefore set forth, the axis of the pins 10—10 is normally at right angles to the axis of the pins 13—13. Disalignment of the shafts 1 and 2 is permitted by rotation of the yoke members about the axes of their respective pivot pins. The normal relation between the axis of the pins 10—10 and the axis of the pins 13—13 is maintained not by the usual rigid spider or intermediate block of the prior art, but by means of a plurality of relatively strong helical springs 20 confined in pairs between the opposing faces of the bearing blocks 15—15 mounted upon the bearing or pivot pins of the joint.

The cooperating bearing blocks 15 of the device with the pivots 10—10 and 13—13 clamped in place are confined between the inwardly extending annular flanges 21 and 22 of a pair of suitable retaining rings 23 and 24, respectively. While the rings 23 and 24 have in this particular instance cooperating threaded engagement, it is to be understood that these rings may be bolted or otherwise suitably secured together. These rings 23 and 24 maintain the proper longitudinal positioning of the yoke or joint members 1 and 2, for maintaining the radially extending axes of the bearing blocks in substantially the same transverse plane. While the helical spring members 20 normally maintain the axis of the pivots 10 at substantially right angles to the axis of the pivots 13, engagement of the bearing blocks 15 with the bearing balls 19 which in turn bear against the thrust collars or flanges 11 and 14, prevents the blocks 15 from being forced out into appreciable frictional engagement with the interior of the ring members 23 and 24. Consequently, the drive is at all times through the springs 20 and not through the ring members 23 and 24.

In operation the drive is transmitted from the pivot pins 13 of the driving yoke or joint member 1 through the relatively strong helical springs 20 to the driven yoke or joint member 2 through the pivot pins 10 carried thereby. It will now be apparent that by thus relieving the pivots of the joint of the driving stresses to which they have been heretofore subjected, the liability of the joint to damage or injury will be decreased and the durability of the joint accordingly increased. Suddenly acting driving forces transmitted through the joint as by reason of the frequent stopping, starting and change speed operations to which motor vehicles, for example, are subjected, will be effectively cushioned and evened out by the helical springs 20 relieving the joint of those shocking forces which have heretofore been so injurious. Either of the springs 20 may be quickly and easily replaced should the occasion arise. The device is adapted to be quickly and easily assembled and dismantled. The co-operating flanged rings 23 and 24 also prevent the entrance of dirt, sand and the like into the raceways for the anti-friction balls 19 and these parts are maintained in good working order.

While I have described my invention in connection with the details of a particular embodiment, I do not intend thereby to limit the invention to such details except as the same are specifically claimed, as I am aware and contemplate that modifications and changes may be made and that the device may be used for other purposes without departing from the invention which is set out in the appended claims.

I claim:

1. A universal joint comprising two heads rotatably mounted on substantially alined axes, bearing blocks rotatably mounted on radially extending axes on said heads respectively, and yielding means secured and held between said bearing blocks for transmitting rotation from one head to the other.

2. A universal joint comprising in combination two heads rotatably mounted on substantially aligned axes, a bearing block rotatably mounted on a radially extending axis on one of said heads, anti-friction bearing means interposed between said block and said head, and yielding means secured and held between said bearing block and the other of said heads for transmitting rotation from one head to the other.

3. A universal joint comprising two heads rotatably mounted on substantially alined axes, bearing blocks rotatably mounted on radially extending axes on said heads respectively, anti-friction bearings interposed between said bearing blocks and said heads, and yielding means secured and held between said bearing blocks for transmitting rotation from one head to the other.

4. In a universal joint, the combination of a pair of rotatable yoke members having pivots provided on their respective extremities, the axes of said respective pivots being radial with respect to the axes of the respective yoke members, bearing blocks journaled on the respective pivots, spring means interposed between the adjacent bearing blocks, and means to maintain said bearing blocks in substantial alignment circumferentially.

5. In a universal joint, the combination of a pair of rotatable yoke members having pivots provided on their respective extremities, the axes of said respective pivots being radial with respect to the axes of the respective yoke members, bearing blocks journaled on the respective pivots, spring means interposed between the adjacent bearing faces of said blocks, inclosure means extending circumferentially around said blocks, and inwardly extending flange means carried by said inclosure means and adapted to engage the respective sides of said blocks, for the purpose specified.

6. In a universal joint, the combination of a pair of yoke members having pivots provided on their respective extremities, thrust collars provided on said respective pivots, bearing blocks journaled on said respective pivots and having race-ways adjacent said respective collars, anti-friction balls in said race-ways, the bearing face of each block being substantially parallel to the adjacent bearing face of the adjacent block, spring means interposed between the adjacent bearing faces of said blocks, and means to maintain said bearing blocks in substantial alignment circumferentially.

7. In a universal joint, the combination of a pair of rotatable yoke members having pivots provided on their respective extremities, the axes of said respective pivots being radial with respect to the axes of the respective yoke members, bearing blocks journaled on the respective pivots, a spring interposed between the adjacent bearing faces of each adjacent pair of blocks on each side of the axes of said pivots, and means to maintain said bearing blocks in substantial alignment circumferentially.

8. In a universal joint, a pair of yoke or joint members having radially projecting pivots, bearing blocks mounted upon said radially projecting pivots, anti-friction bearings between said pivots and said bearing blocks, spring means interposed between said bearing blocks, said spring means opposing relative rotation between said yoke or joint members and a retaining ring or cage cooperating with said bearing blocks to prevent relatively longitudinal movement between said yoke or joint members.

9. In a universal joint, a pair of yoke or joint members having radially projecting pivots, shoulders at the ends of said pivots, bearing blocks bored for the reception of said pivots and counterbored for the reception of the shoulders at the ends of said pivots, and anti-friction bearings between said shoulders and the junctures of the bores and counterbores in said bearing blocks.

10. In a universal joint, the combination of a pair of rotatable yoke members having pivots provided on their respective extremities, the axes of said respective pivots being radial with respect to the axes of the respective yoke members, bearing blocks journaled on the respective pivots, a spring interposed between the adjacent bearing faces of each adjacent pair of blocks on each side of the axes of said pivots, inclosure means extending circumferentially around said blocks, and inwardly extending flange means carried by said inclosure means and adapted to engage the respective sides of said blocks, for the purpose specified.

11. A universal joint comprising two substantially similar heads rotatably mounted on substantially alined axes, two bearing blocks rotatably mounted on a diametrically extending axis on each of said heads at opposite sides thereof, anti-friction bearings interposed between said bearing blocks and said heads, and yielding means secured and held between the adjacent faces of each two adjacent bearing blocks for transmitting rotation from one head to the other.

12. A universal joint comprising in combination two heads rotatably mounted on substantially aligned axes, bearing blocks rotatably mounted on the respective heads on axes in substantially the same transverse plane, and yielding means secured and held between said bearing blocks for transmitting rotation from one head to the other.

13. A universal joint comprising in combination two heads rotatably mounted on substantially aligned axes, bearing blocks rotatably mounted on the respective heads on axes in substantially the same transverse plane, anti-friction bearings interposed between said blocks and said heads, and yielding means secured and held between said bearing blocks for transmitting rotation from one head to the other.

In witness whereof, I hereunto subscribe my name this 7th day of October, 1920.

ALEXANDER F. KAPTULLER.